May 17, 1932.  G. C. CHASE  1,859,195
VARIABLE SPEED TRANSMISSION FOR REGISTERS
Filed Feb. 18, 1929   3 Sheets-Sheet 1

Inventor-
Geo. C. Chase.
by C. W. Anderson Jr.
Attorneys.

May 17, 1932.  G. C. CHASE  1,859,195

VARIABLE SPEED TRANSMISSION FOR REGISTERS

Filed Feb. 18, 1929  3 Sheets-Sheet 2

Inventor.
Geo. C. Chase.
by C.W. Anderson Jon.
attorneys.

Patented May 17, 1932

1,859,195

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

VARIABLE SPEED TRANSMISSION FOR REGISTERS

Application filed February 18, 1929. Serial No. 340,875.

The invention relates to a variable-speed transmission mechanism for calculating machines or other registers, and consists in the novel combination and construction of parts as set forth in the appended claim.

According to the invention, variable-speed transmission elements are employed between the differential selecting members and the driving means of the machine, and provision is made for driving the decimal carry members of the machine at a constant speed ratio with said driving means during the tens-carry phase of the cycle.

An object of the invention is to enable the carry teeth to be arranged upon their shaft in a wider arc, so that the capacity of the machine may be increased by employing additional carry teeth, or to enable the carry teeth to be spaced from each other at greater angles and therefore to be arranged upon a smaller radius.

Another object of the invention is to provide for a low-speed action of certain parts of the machine while passing through the full-cycle position without a corresponding high-speed action of other parts, whereby starting and stopping of the machine under motor operation may be performed under advantageous conditions.

An additional feature of the invention consists in the provision of selector gears designed to operate with increased efficiency at the variable speeds.

In the accompanying drawings, illustrating the invention:

Figure 1:
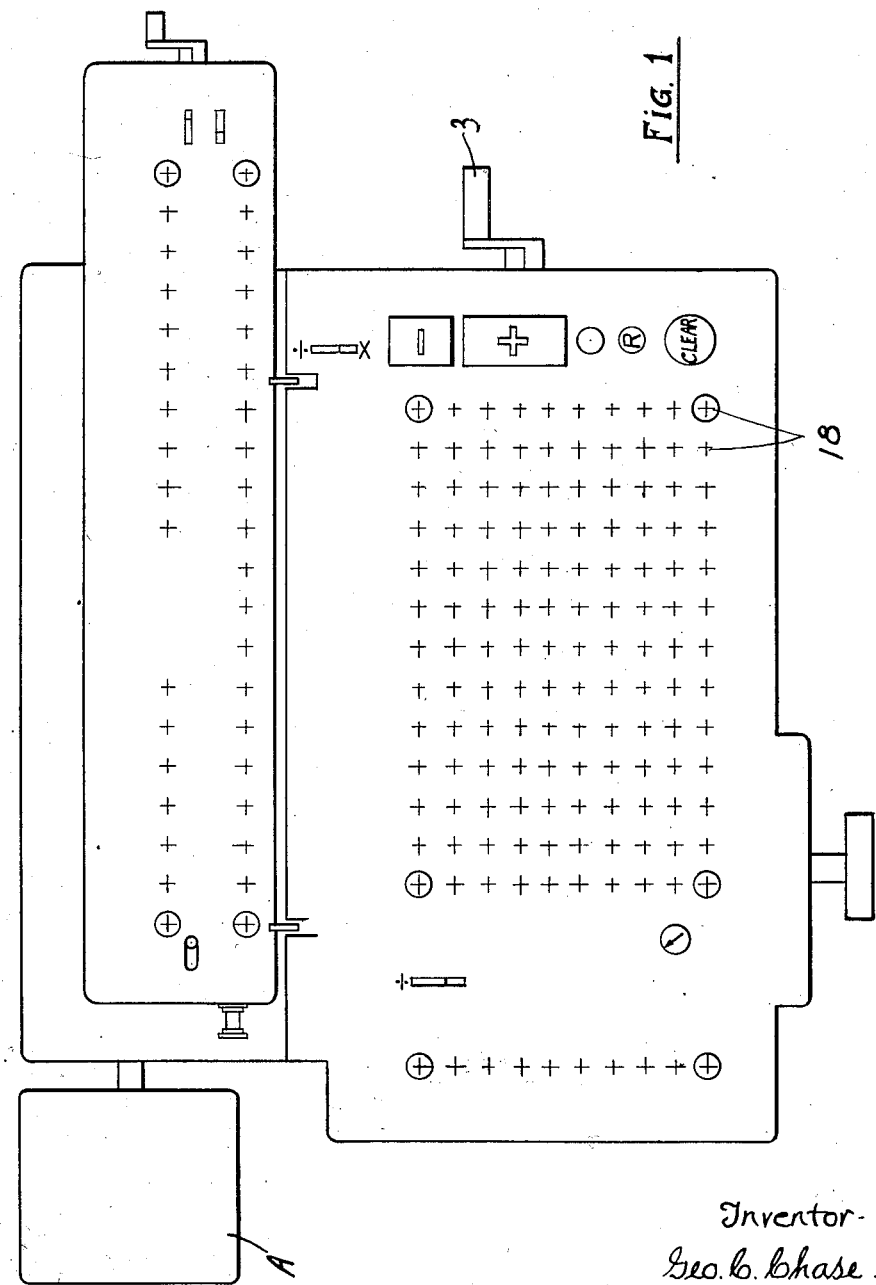
Fig. 1 is a plan view of a calculating machine to which the invention has been applied.
Figure 2:
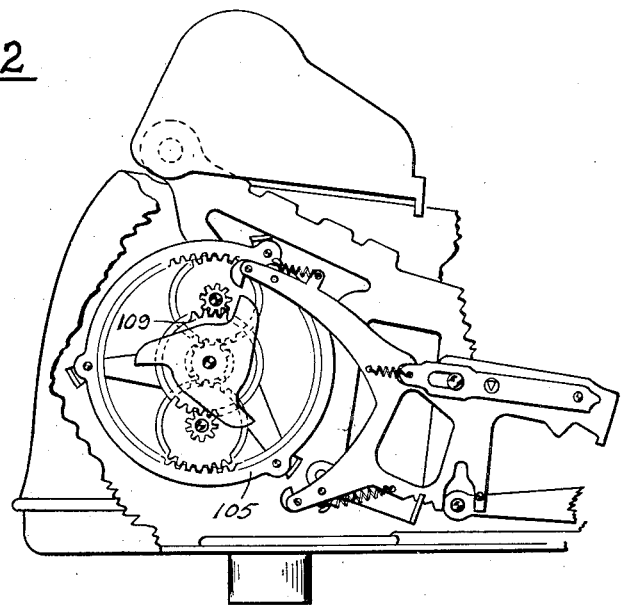
Fig. 2 is a left-hand side view of the same with parts broken away.
Figure 4:
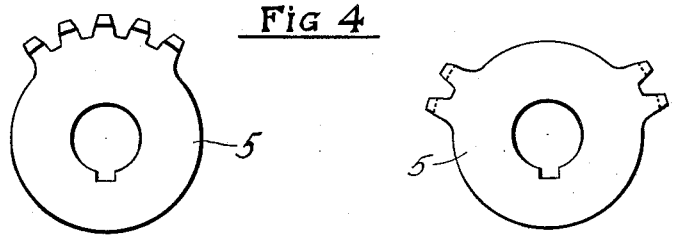
Fig. 4 is a detail face view of the two sections of a selector gear.
Figure 5:
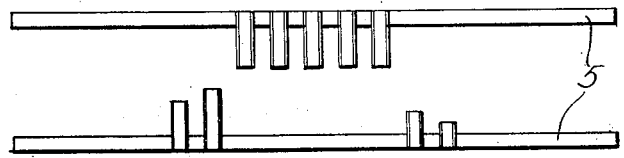
Fig. 5 is a detail projection of the peripheral faces of the same.
Figure 3:
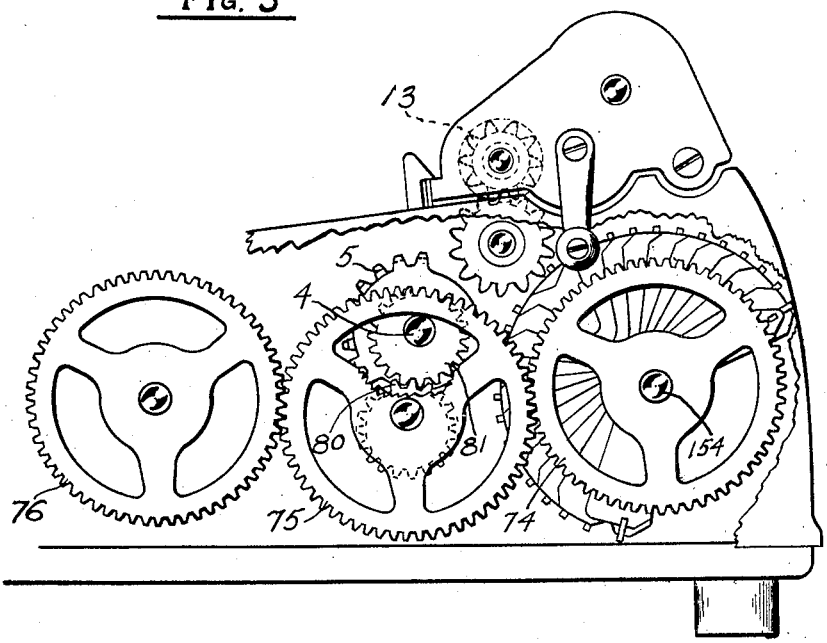
Fig. 3 is a right-hand side view, with parts broken away.

In these drawings, the invention is shown as applied to a calculating machine constructed in accordance with the disclosures of Patent 1,566,650, issued to George C. Chase, December 22, 1925, as modified by the disclosures of co-pending application Serial 337,073, of Edwin F. Britten, Jr., entitled "Registering mechanism". The invention is a modification of the transmission means shown in Patent 1,220,545, issued to E. E. Phinney on March 27, 1917.

Amounts set-up on the keyboard 18 are set on the differential actuating or selecting gears 5, by means of suitable bars 19, wherefrom the amounts are transferred to numeral wheels 13 by the operation of the differential gear shaft 4 and of shaft 154, whereon the decimal carry teeth are mounted. These shafts are connected by gearing 74, 75, 80, 81, and may be driven by means of a hand crank 3 or an electric motor A. Gear 74, on carry shaft 154, is in 1-to-1 ratio with gear 75; and gear 80, fixed upon gear 75, is elliptic, meshing with elliptic gear 81, fast upon selector shaft 4. A gear 76 fast with crank 3 meshes with gear 75, and thereby rotates carry shaft 154 at a 1-to-1 speed ratio, and rotates selector shaft 4 at a variable speed in which low speed will occur at the full-cycle position of the machine and high speed at mid-cycle position.

Motor A is designed to operate carry shaft 154 through differential gearing 105, 109, fully described in the above noted patent to Chase, constant speed rotation of shaft 154 being transmitted as variable speed rotation, to shaft 4, by means of the gear train above described.

The increased sector about carry shaft 154 in which the carry teeth may be arranged permits an increase in the capacity of the machine, since additional carry teeth may be added to the spiral illustrated in the Phinney patent above referred to, without making the angular separation of the teeth too small to permit proper operation of the carrying mechanism. Similarly, the arrangement will permit a given number of carry teeth to be spaced at greater angles, and therefore the radius of the teeth may be reduced without bringing the teeth too close together to secure the proper carrying action. The low speed of the selector mechanism, in passing through full-cycle position, will reduce the inertia of the machine in starting and the concussion encountered in stopping the machine during motor operation.

Inasmuch as the selector gears 5 are driven at a variable speed, it is desirable that the movement transmitted by these gears to the numeral wheels 13, should begin and end during a comparatively low-speed action of the parts, so that percussion and the tendency of the numeral wheels to over-throw, may be reduced. The gears 5 are provided with a plurality of groups of teeth formed on two independently settable gear members, so arranged that any number of teeth from one to nine may be brought into position to operate the numeral wheels-13.

Since the highest speed of the selector gears occurs in mid-cycle position, the larger of the groups (five teeth) is located centrally in full-cycle position, and the teeth of the complementary gear member are spaced apart, so that one or two of the teeth may be brought into active position at one side of the group of five, or two teeth may be brought into active position at one side, and one or two teeth at the other side of the group of five. As in the patents hereinbefore referred to, the gear members may be used independently, or in combination, to set-up any of the digits from one to nine. Various modifications of the above arrangement are within the scope of the present invention, which is, for instance, not limited to use with the decimal system.

I claim:

In a calculating machine having numeral wheels, a differential selector shaft and variable speed driving means for said shaft; gears on said shaft having graded teeth divided into groups of varying numbers, the larger group being composed of teeth of identical extent and located in an intermediate radial position relative to the smaller groups, and means for bringing selected groups of said teeth into active position relative to the numeral wheels.

In testimony whereof I affix my signature.

GEORGE C. CHASE.